United States Patent

[11] 3,584,214

[72] Inventor William H. Peterson
  Homewood, Ill.
[21] Appl. No. 783,933
[22] Filed Dec. 16, 1968
[45] Patented June 8, 1971
[73] Assignee Pullman Incorporated
  Chicago, Ill.

[54] VEHICLE SPEED CONTROL DEVICE
  38 Claims, 8 Drawing Figs.
[52] U.S. Cl. ........................................ 246/182B,
  303/15, 303/21CF
[51] Int. Cl. ........................................... B61l 3/02
[50] Field of Search ........................................ 188/157;
  303/21 CF, 15; 246/182 B

[56] References Cited
UNITED STATES PATENTS
662,144 11/1900 Carroll et al. .................. 200/80X
1,793,589 2/1931 Dapron et al. .................. 303/21(CF)
3,370,166 2/1968 DaRold et al. .................. 246/182(B)

Primary Examiner—Arthur L. La Point
Assistant Examiner—George H. Libman
Attorneys—Hilmond O. Vogel and Wayne Morris Russell ABSTRACT: A railroad car maximum speed limiting device including a railroad car wheel-driven generator and centrifugal speed responsive switch for operating a solenoid to supply air pressure to the vehicle brakes after the vehicle has passed a magnetic trip operating a relay means to complete the generator circuit, the improvement comprising an air cylinder operated by trainline pressure for moving the generator and centrifugal speed responsive switch wheel out of engagement with the car wheel for trainline operation, and a shuttle valve for supplying alternately braking air pressure from the speed control reservoir or from the conventional pressurized air reservoir, and means for adjusting the speed at which the centrifugal speed responsive switch will operate.

PATENTED JUN 8 1971 3,584,214

Inventor
William H. Peterson
By Richard J. Myers
Attorney

Inventor
William H. Peterson
By Richard J Myers
Attorney

VEHICLE SPEED CONTROL DEVICE

It is a general object of this invention to provide an improved speed control device which is rendered inoperative during trainline operation and which shall provide alternate sources of air pressure for braking or not braking the vehicle in accordance with classification yard or trainline operations and also to provide for a speed control device which may be adjustable to operate at the different speeds.

It is further an avowed purpose of this invention to provide for a new and improved speed control device for a railroad car in the classification yard where the free rolling speed of the railroad car is controlled or limited to a specific impact speed, for example, three or four miles per hour, by having the railroad car pass by a magnet for tripping an on vehicle magnetically operated reed switch to operate a relay to complete an electric circuit having its electricity supplied by the generator operated by the rolling of the car and a car wheel driven centrifugal switch operable in excess of the desired speed to complete the circuit for energizing a solenoid valve supplying air pressure to brake the vehicle speed, the speed control device being made inoperative during trainline operations and means controlling the sensitivity of operation of the speed control device at a particular speed, and whereby air pressure may alternately be supplied by a special tank for speed control operation or by the customary air pressure tank on the vehicle that is in use during trainline operation.

These and other objects, purposes and advantages will become apparent by reference to the following description, attached drawings and appended claims.

DESCRIPTION OF THE PREFERRED EMBODIMENT

Figure 1:
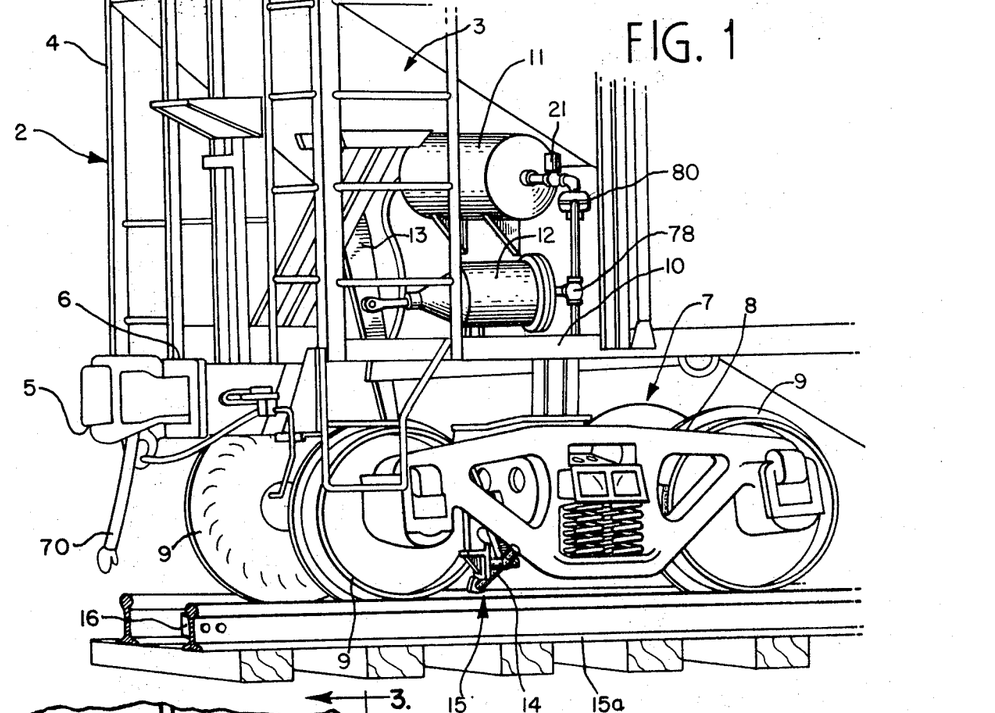
FIG. 1 is a partial view of a railroad hopper car employing the subject invention.
Figure 2:
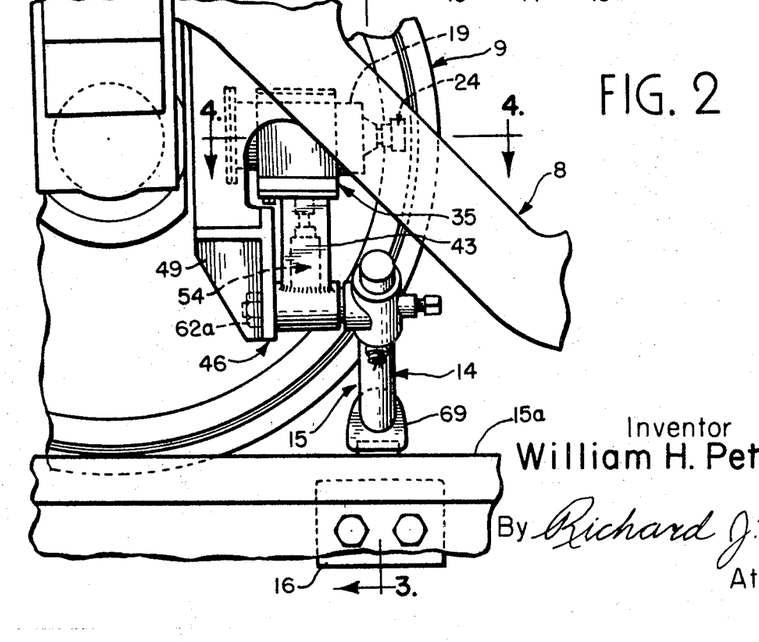
FIG. 2 is an enlarged partial view of FIG. 1 illustrating the magnetic pickup or switch device and generator of the invention.

With reference now to the drawings and in particular with reference to FIG. 1, there is shown a partial view or end portion of a railroad hopper car with the usual hopper 3 and end structure 4, coupler means 5 and center sill means 6, truck means 7 with truck frame 8 and wheels 9. The end deck portion 10 of the hopper car carries the pressurized fluid or air in a reservoir tank 11 and the vehicle brake cylinder 12 operating brake rigging 13 for applying the brakes (not seen) to the vehicle 2.

The speed of the rolling car or vehicle within a classification yard is controlled by a speed control device 15 operative on the vehicle brakes, the operation and general arrangement of said device 15 being generally shown and described in my copending U.S. Pat. application, Ser. No. 694,447 filed Dec. 29, 1967, which is incorporated herein by reference.

Figure 6:
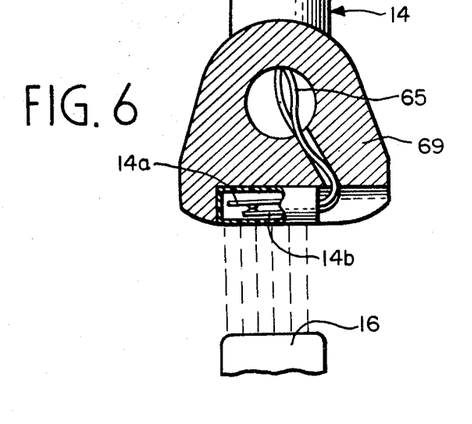
FIG. 6 is a partial sectional view taken along line 6-6 of FIG. 3.
Figure 7:
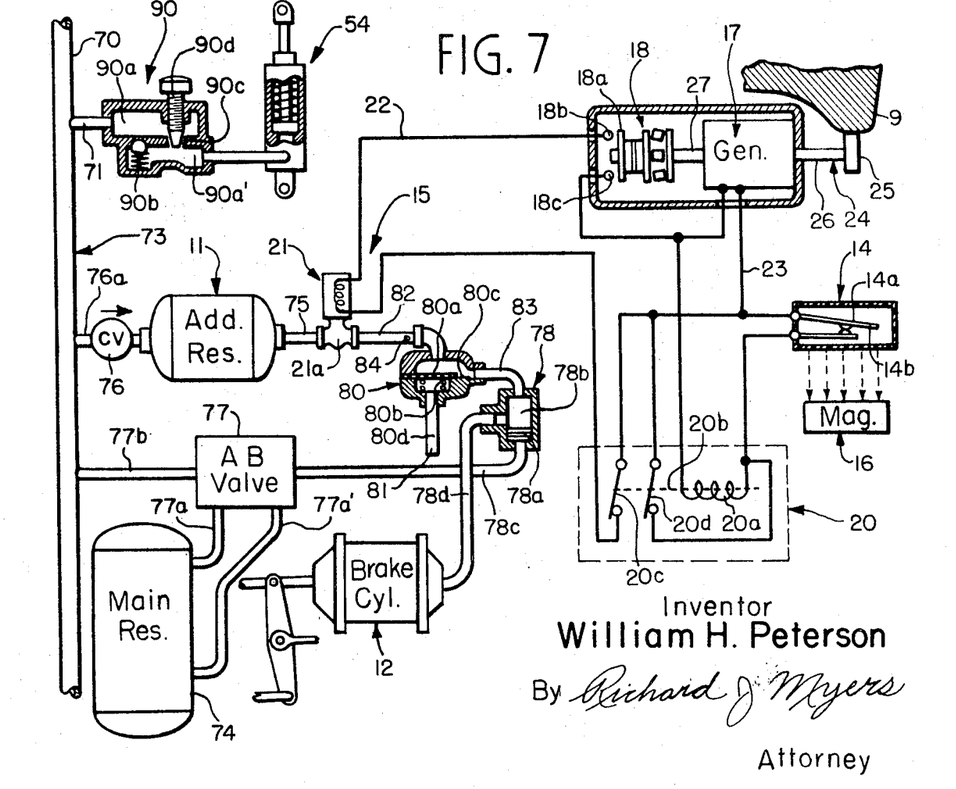
FIG. 7 is a schematic diagram showing the electrical-pneumatic circuitry of the various operational components of the speed control device.

The speed control device is provided with a magnetic responsive switch means 14 mounted on the end portion of the truck frame 8 and so placed adjacent the rail means 15a as to be influenced magnetically by magnet or off-vehicle conditioning or tripping means 16 (carried by bracket 16a mounted on rail 15a) of the device 15 as the car moves by the magnet 16 as more clearly seen in FIGS. 2, 3, 6 and 7. The speed control device is further provided with a railroad car wheel-driven generator means 17 which is a direct current generator with a permanent magnet field and a railroad car wheel-driven centrifugal speed responsive switch means 18. The speed control device is further provided with a relay means or starter means 20 and a solenoid valve means 21, as seen in FIG. 7. The generator 17, the speed responsive or switch means 18, the relay means 20 and the solenoid valve means 21 are all in series in the electrical circuit 22 such that when the switch means 18 closes the circuit 22 and the relay means 20 is in the energized condition the solenoid valve means 21 is opened to allow air under pressure from the additional reservoir tank 11 to go to the brake cylinder means 12 for applying the vehicle brakes. The relay means 20 is energized to complete the circuit 26, when there is sufficient electric current generated by the generator 17 due to sufficient movement of the vehicle or car. The relay means 20 will be energized when the magnet means 16 actuates the magnetic responsive reed switch or relay actuating switch to close magnetic drawn contact 14a against contact 14b to complete the holding series circuit 23 which includes the generator, the switch 14 and the magnet 16 and the relay means 20. The relay means 20 includes the relay coil 20a and plunger 20b from moving contacts 20c and 20d for closing circuit 22. The contact arm 18a of the switch means 18 comes in contact with electrical contacts 18b and 18c of circuit 22 when the vehicle speed exceeds 4 m.p.h. to complete the circuit 22 at that point. The generator 17 is driven by the drive means 24 which also drives the switch means 18. The drive means 24 includes the railroad wheel engaging drive wheel or gear 25 which drives the generator shaft part 26 and the centrifugal speed responsive switch operating shaft 27 extending from the shaft part 26 and constrained for movement therewith. Rotation of shaft part 26 operates the generator 17 to supply the necessary current to operate the speed control device and shaft part 27 operates the centrifugal device or switch means 18 by throwing weights 28 and 29 radially outwardly to cause switch means end part 30 to engage button 31 of switch element 32 to complete the circuit at the centrifugal speed responsive switch for energizing the solenoid valve 21 by electrical conduit means 33, see FIG. 4.

Figure 5:
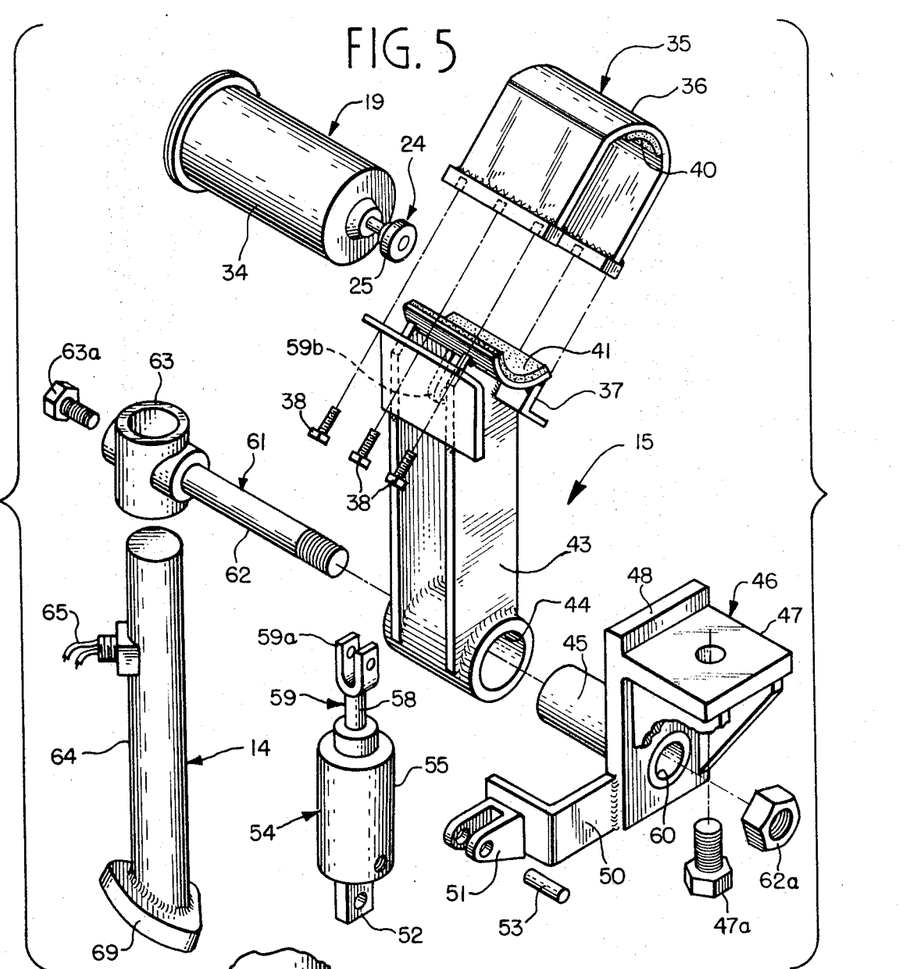
FIG. 5 is an exploded view of the arrangement of various components of the speed control device.

As best seen in FIG. 5, the generator 17 and the centrifugal switch means 18 are contained within a common housing 34 of the generator centrifugal switch unit 19 which is carried by saddle structure or mounting bracket unit 35 which comprises a U-shaped portion 36 fitting around the housing 34 and a closure plate or clamp portion 37 with bolts 38 holding the parts 36 and 37 together around the housing 34, the interiors of each part 36 and 37 having arcuate cushioning pad portions 40 and 41 respectively for embracing the housing 34 and relieving same against shock loading. The mounting part 37 of the bracket means 35 is fixed on the generator-centrifugal speed responsive switch carriage arm 43. The arm 43 has provided at its lower end a journal portion 44 for reception of stub shaft 45 of the mounting bracket unit 46. The bracket unit 46 has a horizontal plate 47 and an upright shoulder 48 for engaging against the depending arm portion 49 and held thereto by bolt means 47a (see FIG. 2) of the truck frame 8. The bracket element 46 is provided with a horizontally outwardly extending L-shaped arm 50 which carries a clevis structure 51 at the outer end thereof for reception of an arm 52 held thereto by means of pin 53, as seen in FIG. 5. The arm 52 forms part of the pressurized fluid or air cylinder or power unit 54 which consists of a cylinder 55 and an internal piston head 56 resiliently urged inwardly by spring 57, the piston head being carried on plunger stem 58 of plunger member or ram 59 which is movable with respect to the cylinder 55, the arm 52 being fixed with respect to the cylinder 55. The power or drive cylinder means 54 moves the generator and speed responsive switch unit 19 between operative and inoperative positions.

Figures 3, 3A:
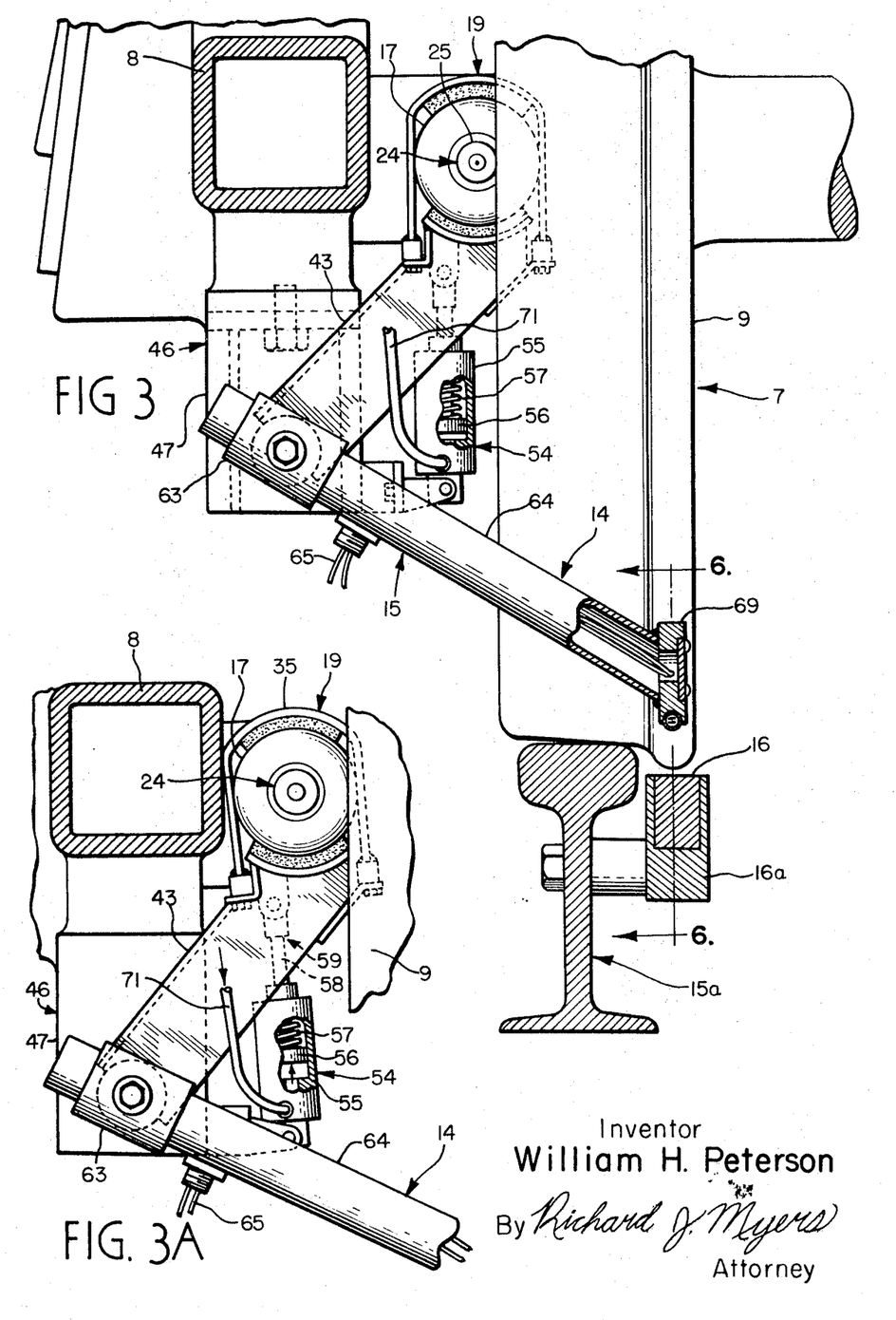
FIG. 3 is a sectional view taken along line 3-3 of FIG. 2 showing the magnetic pickup device and generator and centrifugal switch unit in an operative position.
FIG. 3A is a view similar to FIG. 3 but showing the magnetic switch device and generator and centrifugal switch unit in an out-of-use position.
Figure 4:
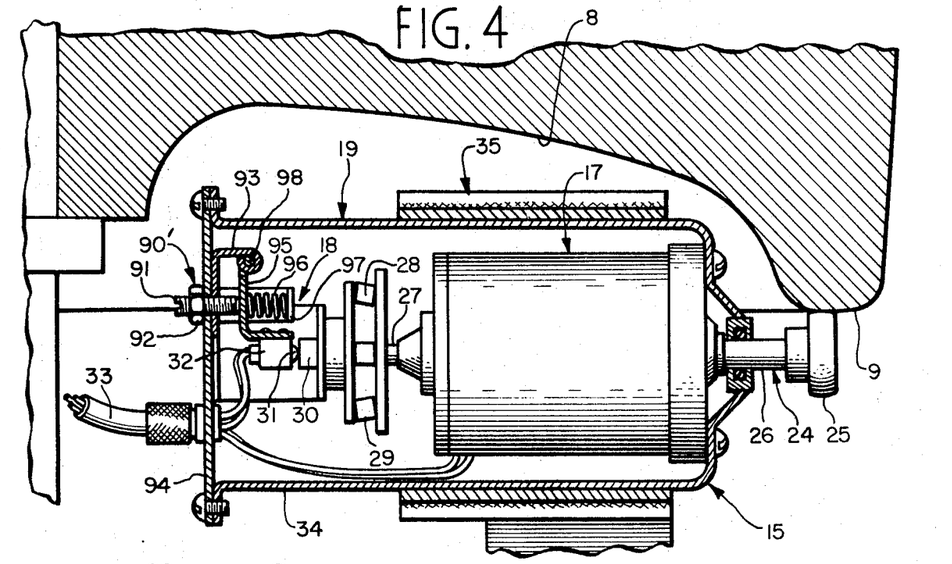
FIG. 4 is a sectional view taken along line 4-4 of FIG. 2.

The hollow stub shaft 45 (received in bracket 46) has a hollow bore 60 and is extendable into the journal 44 of the arm structure 43 as is readily apparent from the exploded view of FIG. 5. A coupling element 61 has a shaft 62 extendable through the aperture 60 in the assembled condition of the elements 46 and 43 (held together with nut means 62a) and has a coupled journal portion 63 receiving the arm 64 (held to part 63 by setscrew 63a) of the magnetic pickup relay means 14. The arm 64 and thus magnet switch means 14 is fixed with respect to truck frame 8. The arm 64 is hollow for receiving electrical wires 65 which terminate in a reed switch arrangement 14 including an upper contact arm 14a which is magnet-responsive and a lower contact arm 14b which will have the upper arm 14a drawn to it by magnet 16 when passing thereby in order to complete the electrical circuit 23 through connecting together of wiring 65. The reed switch elements 14a and 14b are contained in the lower or head portion 69 of the mechanism 14. The generator-centrifugal speed responsive switch unit 19 and the magnetic pickup means 14, as seen by FIG. 5, are all carried by the bracket structure 35, 63, 64, 43 and 46 and the air cylinder 54 has its fixed end 52, as previously mentioned, coupled to journal 51 and the free end or plunger 59 is pivotally connected by its trunnion 59a to arm 59b carried by element 37 which allows for movement of the generator-centrifugal switch unit 19 to selectively permit engagement and disengagement of the wheel 25 with the car wheel 9 due to pivotal movement of the arm 43 at its journaled means 44 about shaft portions 45. The engaged position of the wheel 25 with the wheel 9 and the positioning of the pickup unit 14 over the rail 15a and associated magnet 16 is seen in FIG. 3. FIG. 3a on the other hand shows the position of the generator-centrifugal switch unit 19 out of engagement with the wheel 9. As stated, the power unit or air cylinder means 54 moves the generator-centrifugal switch unit 19 from operative to inoperative position, i.e., from classification yard operation to in trainline operation (when the air trainline 70, see FIGS. 1 and 7, is coupled to the trainline of an adjacent standing car of a train for road operation) and air under pressure is thereby introduced into the trainline 70 and into air hose 71 (see FIGS. 3 and 7) to supply air under pressure to the air cylinder means 54 for operating same to swing the generator-centrifugal switch unit 19 away from the car wheel.

Now, with reference to FIG. 7, it is seen that the pneumatic circuit 73 is coupled with the electrical circuit through the solenoid operated air supply valve 21. The pneumatic circuit 73 includes the air cylinder means 54 for placing the generator switch structure in operative and inoperative positions, and includes the main air reservoir 74 as used on conventional cars supplied with pressurized air from the line 70, as well as the additional reservoir 11 and check valve 76 directing the flow one way to the reservoir 11. A conventional AB valve 77 is disposed between the main reservoir 74 and the two-way or sliding free piston valve unit 78. Line 70 connects with the reservoir 11 by way of line 76a and with the AB valve 77 by way of line 77b. The AB valve 77 connects with the main reservoir (auxiliary reservoir and emergency reservoir unit) 74 by way of lines 77a and 77a' and connects with the two-way valve means 78 by way of line 78c. A pressure-responsive dump valve or pressure relief (exhaust) valve 80 for exhausting the air to the atmosphere by way of line 81 connects with the solenoid valve 21 by way of line 82 and with the two-way valve 78 by way of line 83, the solenoid valve 21 connecting with the additional or solenoid valve supply reservoir 11 by line 75. The pneumatic operation of the system 73 is as follows. The additional air supply or reservoir 11 is filled or charged with air as is the main reservoir 74 when the trainline 70 is coupled with another car for over-the-road or in trainline operation which is standard operating procedure for charging of the main reservoir 74. When the trainline 70 is in a disconnect position so that the car 2 is by itself and in a free rolling state having passed a hump in a classification yard, the magnet 16 acts upon the relay actuating or reed switch means 14 to energize the relay 20 to complete the circuit to the generator.

Next, the switch means 18 completes the circuit to energize the solenoid valve means 21 when the railroad car is rolling at speeds of 4 m.p.h. or in excess thereof. Then air under pressure passes from the additional reservoir 11 through the solenoid valve 21a which is now in the energized or opened position through lines 75, 82 and through the pressure-responsive valve 80, through line 83 and into valve 78 to move the sliding free piston 78a to allow the pressurized air to pass into conduit 78b and to the brake cylinder 12 for applying the vehicle brakes to slow down the car. The valve 78 thus serves to isolate the brake cylinder 12 from the existing conventional AB valve 77 and main reservoir 74 when the speed control device is in use. Once the speed of the car has fallen below the predetermined speed of 4 m.p.h. the switch means 18 breaks the circuit and deenergizes the solenoid valve 21 allowing the valve 21a to cut off the supply of pressurized air from reservoir 11 to the valve means 78. Then air bleeding through air bleed opening 84 in line 82 causes a drop in pressure across the diaphragm 80a to have diaphragm spring 80b raise the diaphragm 80a to permit air in the brake cylinder 12 to dump past valve seat 80c and to atmosphere tube 80d to rapidly exhaust the pressurized air to the atmosphere for removing application of the vehicle brakes to the vehicle wheel. During trainline operations when the solenoid valve means 21 is deenergized, air under pressure can only come from the main reservoir 74 via the AB valve 77 and through line 78c into the chamber 78b to move the sliding free piston 78a to a position to permit the air under pressure to communicate with line 78d and not with line 83. The supply of air under pressure from the main reservoir via the AB valve to the brake cylinder is conventional operation.

The amount of distance that the element 30 must travel in order to engage the element 31 of the switch 32 may be adjustable by the switch adjustment means 90' which includes setscrew 91 and nut 92 mounted on arm 93 held to the back plate 94 of the housing 34, the arm 93 pivotally carrying arm 95 biased against the screw 91 by spring 96 held by retainer 97 mounted to the housing 34. Extension of the screw 91 inwardly swings the arm 95 inwardly or counterclockwise about pivot 98 against the action of the spring 96 to insure an earlier contact between switch contact portions 30 and 31 and therefore a lesser vehicle speed would be required to operate the speed control device; whereas if the screw 91 is moved outwardly the arm 95 carrying the switch 31 is removed further from contact part 30 requiring therefore a greater distance for arm 30 to travel and therefore a greater vehicle speed would be required for the speed control device to operate.

A flow control valve means 90 is placed in line 71 between the trainline 70 and the air cylinder means 54. The flow control valve means 90 has a check valve 90b between chambers 90a and 90a' to permit flow from the trainline 70 to the air cylinder means 54 but not in the reverse way. The valve means 90 is further provided with an adjustable means 90d in the form of a tapered setscrew adjustable in and out of a tapered threaded opening 90c between chambers 90a and 90a' to allow flow from chamber 90a' to 90a via the bleed orifice 90c which is a restricted flow orifice. As stated, during train operation, pressure is maintained in the cylinder means 54 to keep the speed control unit 15 out of engagement with the car wheel. During emergency brake applications, such as if the car is going 70 m.p.h. and the brakes are applied, the pressure in the trainline 70 drops to practically zero and if it were not for the flow control means 90, the fluid pressure would also drop to zero in the cylinder means 54 causing immediate engagement of the wheel 25 of the speed control device with the wheel 9 of the car. At speeds of 70 m.p.h. the generator means 17 would be operated at such high revolutions per minute that the unit 17 could be damaged. The flow control means 90 permits the air in the line 71 to gradually drop because of the restriction afforded by the adjustable screw 90d and its orifice 90c so that, say, for a period of 5 minutes the pressure in the cylinder means 54 is not sufficiently low enough to allow engagement of its wheel 25 with the wheel 9, thus permitting the speed of the train to drop, say, to 10 m.p.h. before engagement of wheel 25 with the wheel 9 and consequently avoiding any damage to the generator which will now be operated at a much lower speed.

The foregoing description and drawings are given merely to explain and illustrate the invention, and the invention is not to be limited thereto since those skilled in the art who have the disclosure before them will be able to make modifications and variations therein without departing from the scope of the invention.

What I claim is:

1. A speed control device for a railroad car to control the speed of the car within predetermined limits comprising:

a wheel driven governor, speed control valve means to supply fluid under pressure to an associated car brake cylinder for operating the associated car wheel brakes and operatively associated with said governor and opened thereby upon exceeding a predetermined maximum speed for supplying the fluid under pressure to the brake cylinder, conditioning means operatively connected with said speed control valve means and the governor and selectively controlling the operation of said valve means in accordance with the speed of the car, off-car mounted tripping mechanism being operatively associated with said conditioning means to operate same and to set the conditioning means to cause a supply of pressurized fluid to said speed control valve means when required, said governor comprising a speed responsive unit operable in accordance with the predetermined maximum speed of the car to cause operation of the valve means, and mounting means pivotally mounting the speed responsive unit on the car for movement of the speed responsive unit between operative and inoperative positions.

2. The invention according to claim 1, and said device including a wheel driven generator connecting with the speed responsive unit and the valve means and operative upon the latter when a predetermined speed is exceeded to brake the car.

3. The invention according to claim 1, and movable means for moving said mounting means between operative and inoperative positions.

4. The invention according to claim 3, and said movable means including a fluid operated ram means which, upon extension and contraction in response to the fluid under pressure, moves said mounting means and said speed responsive unit thereby between said operative and inoperative positions.

5. The invention according to claim 4, and means having a source of pressure introduced to said fluid operated ram means for moving the speed responsive unit to the inoperative position.

6. The invention according to claim 1, and said speed responsive unit comprising a centrifugal speed responsive switch.

7. The invention according to claim 1, and said speed responsive unit comprising a centrifugal speed responsive switch, generator means being operated by the movement of said car and operative to supply a source of electrical energy to said speed control valve means when said centrifugal speed responsive switch closes the circuit between the speed responsive control valve means and the generator.

8. A speed control device for a railroad car to control the speed of the car within predetermined limits comprising:

a wheel driven means and a governor driven by said wheel means, speed control valve means to supply fluid under pressure to an associated car brake cylinder for operating the associated car wheel brakes and operatively associated with said governor and opened thereby upon exceeding a predetermined maximum speed for supplying the fluid under pressure to the brake cylinder, conditioning means operatively connected with said speed control valve means and the governor and selectively controlling the operation of said valve means in accordance with the speed of the car, off-car mounted tripping mechanism being operatively associated with said conditioning means to operate same and to set the conditioning means to cause a supply of pressurized fluid to said speed control valve means when required, and pneumatic means including a first reservoir, a second reservoir, passage means supplying fluid to each reservoir, conduit means connecting with each of the reservoirs for supplying braking fluid to the brake cylinder, said conduit means including a first conduit connecting with the speed control valve and with the first reservoir and a second conduit connecting with the second reservoir, two-way valve means adapted for connecting with the associated brake cylinder and connecting with each of the conduits, and means in said two-way valve means for selectively and alternately supplying communication between one of the conduits and the brake cylinder, said governor upon operating of said speed control valve means allowing communication of the first conduit with the brake cylinder and preventing communication of the second conduit with the brake cylinder.

9. The invention according to claim 8, and said two-way valve means having a port communication with the first conduit and having a port communication with the second conduit and having a port communication with the brake cylinder and passage blocking means reciprocally disposed in said two-way valve and movable in response to pressure in either the first or second conduit for moving the passage blocking means to the other position for communication of the other conduit with the brake cylinder.

10. The invention according to claim 8, and a quick exhaust valve being disposed between the speed control valve means and the two-way valve means and bleed hole means operatively associated with and operative upon the first conduit for dropping the pressure therein and exhausting fluid under pressure from the associated brake cylinder and out the quick exhaust valve means.

11. The invention according to claim 10, and said quick exhaust valve means including a resiliently loaded diaphragm operable to exhaust the fluid from the brake chamber upon a drop in pressure in the first conduit.

12. A speed control device for a railroad car to control the speed of the car within predetermined limits comprising:

a wheel driven governor, speed control valve means to supply fluid under pressure to an associated car brake cylinder for operating associated car wheel brakes and operatively associated with said governor and opened thereby upon exceeding a predetermined maximum speed for supplying the fluid under pressure to the brake cylinder, conditioning means operatively connected with said speed control valve means and the governor and selectively controlling the operation of said valve means in accordance with the speed of the car, off-car mounted tripping mechanism being operatively associated with said conditioning means to operate same and to set the conditioning means to cause a supply of pressurized fluid to said speed control valve means when the predetermined speed is exceeded, said speed control valve means including an electrical solenoid valve and said governor including a centrifugal speed responsive switch and an electrical generator for supplying current, the generator and switch being drivingly operated by engagement with the railroad wheel whereby an electrical current is supplied to the solenoid valve for energizing the same upon closing of the switch when the vehicle reaches a predetermined speed, said switch including a first fixed contact portion and a second movable switch portion movable toward the first fixed portion upon increase in car speed, and means for movably adjusting the fixed contact portion with respect to the movable portion for variably adjusting the maximum car speed required to energize the solenoid valve.

13. The invention according to claim 12, and said variable adjustable means providing a setscrew means for movement of the fixed contact portion toward and away from the movable switch portion.

14. A speed control device for a railroad car to control the speed of the car within predetermined limits comprising:
a wheel driven governor including a speed responsive means,
speed control valve means to supply fluid under pressure to an associated car brake cylinder for operating associated car wheel brakes and operatively associated with said governor and opened thereby upon exceeding a predetermined maximum speed for supplying the fluid under pressure to the brake cylinder,
conditioning means operatively connected with said speed control valve means and the governor and selectively controlling the operation of said valve means in accordance with the speed of the car,
off-car mounted tripping mechanism being operatively associated with said conditioning means to operate same and to set the conditioning means to cause a supply of pressurized fluid to said speed control valve means when required,
a wheel driven generator, and
mounting means carrying said speed responsive means and said generator and being pivotal between an engaged position for operation of the speed control device in a speed control position and in a position where said speed control device is inoperative.

15. The invention according to claim 14, and movable means connecting with the mounting means and moving same for pivoting said generator and said speed responsive means between operative and inoperative positions of the speed control device.

16. A speed control device for a vehicle comprising:
an electric circuit,
an electric generator in said circuit and for mounting on the car and operatively connectable with the vehicle wheel and drivable thereby,
a speed responsive switch in said circuit and operatively connectable with said wheel and drivable thereby to complete the electric circuit to the generator in going from an open position to a closed position when the vehicle exceeds a predetermined speed,
an off-vehicle trigger responsive switch element in said circuit having opened and closed circuit positions and mountable on said vehicle and connecting with the generator,
a holding relay in said circuit being in series connection with said switch element and said generator whereby when said switch element is in the closed position said holding relay is energized, said holding relay being mountable on said vehicle,
a solenoid actuated air valve for supplying and terminating the supply of air pressure to the associated vehicle brakes being in said circuit and having a series connected with said relay and said speed responsive switch and with said generator when said holding relay is energized, said solenoid valve being mountable on said vehicle,
said speed responsive switch, in going from the open to the closed position upon the vehicle's exceeding a predetermined speed, causes the solenoid valve to be placed in a closed circuit series connection with the generator with the holding relay being energized whereby the solenoid valve is moved for supplying air pressure to brake the vehicle, whereupon when the vehicle speed falls below the predetermined speed the speed responsive switch opens the circuit and the solenoid valve closes off the air supply to the vehicle brakes, and mounting means carrying said speed responsive switch and said generator and being pivotal between an engaged position for operation of the speed control device in a speed control position and in a position where said speed control device is inoperative.

17. A speed control device for a vehicle comprising:
an electric circuit,
an electric generator in said circuit and for mounting on the vehicle and operatively connectable with the vehicle wheel and drivable thereby,
a speed responsive switch in said circuit and operatively connectable with said wheel and drivable thereby to complete the electric circuit to the generator in going from an open position to a closed position when the vehicle exceeds a predetermined speed,
an off-vehicle trigger responsive switch element in said circuit having opened and closed circuit positions and mountable on said vehicle and connecting with the generator,
a holding relay in said circuit being in series connection with said switch element and said generator whereby when said switch element is in the closed position said holding relay is energized, said holding relay being mountable on said vehicle,
a solenoid actuated air valve for supplying and terminating the supply of air pressure to the associated vehicle brakes being in said circuit and having a series connected with said relay and said speed responsive switch and with said generator when said holding relay is energized, said solenoid valve being mountable on said vehicle,
said speed responsive switch, in going from the open to the closed position upon the vehicle's exceeding a predetermined speed, causes the solenoid valve to be placed in a closed circuit series connection with the generator with the holding relay being energized whereby the solenoid valve is moved for supplying air pressure to brake the vehicle, whereupon when the vehicle speed falls below the predetermined speed the speed responsive switch opens the circuit and the solenoid valve closes off the air supply to the vehicle brake means, and
pneumatic means including a first reservoir, a second reservoir, passage means supplying fluid to each reservoir, conduit means connecting with each of the reservoirs for supplying braking fluid to the brake cylinder, said conduit means including a first conduit connecting with the speed control valve and with the first reservoir and a second conduit connecting with the second reservoir, two-way valve means adapted for connecting with the associated brake cylinder and connecting with each of the conduits, and means in said two-way valve means for selectively and alternately supplying communication between one of the conduits and the brake cylinder, said solenoid valve allowing communication of the first conduit with the brake cylinder and preventing communication of the second conduit with the brake cylinder when the vehicle exceeds the predetermined speed.

18. A speed control device for a vehicle comprising:
an electric circuit,
an electric generator in said circuit and for mounting on the vehicle and operatively connectable with the vehicle wheel and drivable thereby,
a speed responsive switch in said circuit and operatively connectable with said wheel and drivable thereby to complete the electric circuit to the generator in going from an open position to a closed position when the vehicle exceeds a predetermined speed,
an off-vehicle trigger responsive switch element in said circuit having opened and closed circuit positions and mountable on said vehicle and connecting with the generator,
a holding relay in said circuit being in series connection with said switch element and said generator whereby when said switch element is in the closed position said holding relay is energized, said holding relay being mountable on said vehicle, a solenoid actuated air valve for supplying and terminating the supply of air pressure to the associated vehicle brakes being in said circuit and having a series connected with said relay and said speed responsive switch and with said generator when said holding relay is energized, said solenoid valve being mountable on said vehicle, said speed responsive switch, in going from the open to the closed position upon the vehicle's exceeding a predetermined speed, causes the solenoid valve to be placed in a closed circuit series connection with the generator with the holding relay being energized whereby the solenoid valve is moved for supplying air pressure to brake the vehicle, whereupon when the vehicle speed falls below the predetermined speed the speed responsive switch opens the circuit and the solenoid valve closes off the air supply to the vehicle brakes, said switch including a first fixed contact portion and a second movable switch portion movable toward the first fixed portion upon increase in vehicle speed, and means for movably adjusting the fixed contact portion with respect to the movable portion for variably adjusting the maximum vehicle speed required to energize the solenoid valve.

19. A speed control device for a vehicle comprising:
an electric circuit,
an electric generator in said circuit and for mounting on the vehicle and operatively connectable with the vehicle wheel and drivable thereby,
a speed responsive switch in said circuit and operatively connectable with said wheel and drivable thereby to complete the electric circuit to the generator in going from an open position to a closed position when the vehicle exceeds a predetermined speed,
an off-vehicle trigger responsive switch element in said circuit having opened and closed circuit positions and mountable on said vehicle and connecting with the generator,
a holding relay in said circuit being in series connection with said switch element and said generator whereby when said switch element is in the closed position said holding relay is energized, said holding relay being mountable on said vehicle,
a solenoid actuated air valve for supplying and terminating the supply of air pressure to the associated vehicle brakes being in said circuit and having a series connected with said relay and said speed responsive switch and with said generator when said holding relay is energized, said solenoid valve being mountable on said vehicle,
said speed responsive switch, in going from the open to the closed position upon the vehicle's exceeding a predetermined speed, causes the solenoid valve to be placed in a closed circuit series connection with the generator with the holding relay being energized whereby the solenoid valve is moved for supplying air pressure to brake the vehicle, whereupon the vehicle speed falls below the predetermined speed the speed responsive switch opens the circuit and the solenoid valve closes off the air supply to the vehicle brakes, and
mounting means for said speed responsive switch for attaching the speed responsive means to the vehicle, said mounting means being pivotal between an engaged position for operation of the speed control device in a speed control position and having a position where said speed control device is ineffective.

20. The invention according to claim 19, and means for pivotally moving said mounting means between operative and inoperative positions.

21. The invention according to claim 20, and said means for moving including a pneumatically operated ram and cylinder jack means.

22. In a railroad vehicle having a frame structure and having ground engaging means, a vehicle speed control device comprising:
a ground driven generator provided with shaft means driven by the rotation of said ground engaging means,
vehicle mounted solenoid operated fluid supply valve,
centrifugal speed responsive means operably engageable with said shaft means and operable upon a predetermined rotational speed of said ground engaging means for operably coupling said generator with the vehicle solenoid operated fluid supply valve for operating the latter to supply and terminate fluid under pressure to the associated vehicle brake means for operation thereof when the predetermined speed is exceeded,
starter means operatively connected with said generator and said supply valve and operated by associated ground mounted energizing means to prepare for operation of said speed control device, and
means mounted on said vehicle frame structure and carrying said generator to and from operable engagement with said ground engaging means.

23. The invention according to claim 22, and said means mounted on said vehicle frame structure further operatively carrying said centrifugal speed responsive means for moving said starter means from inoperable to operable position with respect to the ground engaging means and being mounted on said vehicle frame structure.

24. The invention according to claim 22, and said centrifugal speed responsive means including adjustment means for varying the predetermined speed at which the speed responsive means is operative.

25. The invention according to claim 22, and said centrifugal speed responsive means including an electrical switch being provided with centrifugal weight means adapted to move the switch to a closed position upon an increase in vehicle speed.

26. The invention according to claim 25, and adjustment means mounted on said centrifugal switch and including an adjustable set member fixedly mounted on the switch and a contact portion mounted operatively with said weight means and responsive to going into contact with said adjustable set-member.

27. The invention according to claim 22, and said means mounted on the vehicle frame structure including a pivotally mounted frame carrying said generator in pivotal movement toward and away from said ground engaging means.

28. The invention according to claim 27, and a pneumatically operated ram unit moving said pivotally mounted frame from operative to inoperative position upon a change in pressure in said ram unit.

29. The invention according to claim 28, and said centrifugal speed responsive means being carried by said frame and being placed from operative to inoperative position also upon a change in pressure in said ram unit.

30. The invention according to claim 22, and pneumatic means for supplying the pressure fluid to said brake cylinder including a first reservoir for supplying fluid pressure by way of the solenoid valve to said brake cylinder and a second reservoir for supplying pressurized fluid to the brake cylinder via an associated second valve,
flow control means in the form of a two-way valve including means responsive to fluid pressure from the solenoid valve or from the second valve to supply selectively pressurized fluid to the brake cylinder, said means including a flow blocking valve member movable in one direction by the solenoid valve and in the other direction by the second valve.

31. The invention according to claim 30, and a valve structure for supplying the pressurized fluid to a low pressure area including a bleed valve hole adjacent the solenoid valve and pressure responsive diaphragm valve movable to exhaust the air to the low pressure area when pressurized fluid is blocked by the two-way valve between the solenoid valve and the brake cylinder.

32. The invention according to claim 22, and said means mounted on said vehicle frame structure comprising an arm extending from said frame structure downwardly adjacent the ground, said arm carrying at its lower end said starter means for placing the starter means adjacent the associated ground mounted energizing means.

33. The invention according to claim 32, and said starter means including a magnetically responsive switch energizable by said ground mounted energizing means, and
   relay means operable upon closing of said switch to connect the generator with the solenoid operated valve when the predetermined vehicle speed is exceeded.

34. The invention according to claim 1, and said mounting means having flow control means including one-way flow means for actuation of said speed control device into an operative position, and
   bleed means in said flow control means for deactivating operation of said speed control device.

35. The invention according to claim 5, and flow control means between said ram means and a source of fluid pressure,
   said flow control means including a one-way valve permitting flow from the source of pressure to the ram means for moving said speed responsive unit to the inoperative position and including orifice means to allow escape of fluid under pressure from said ram means to said source of pressure in the other direction to place the speed responsive unit in the operative position.

36. The invention according to claim 16, and said mounting means having flow control means including one-way flow means for actuation of said speed control device into an operative position, and
   bleed means in said flow control means for deactivating operation of said speed control device.

37. The invention according to claim 20, and said means for pivotally moving said mounting means having flow control means including one-way flow means for actuation of said speed control device into an operative position, and
   bleed means in said flow control means for deactivating operation of said speed control device.

38. The invention according to claim 21, and flow control means between said ram means and a source of fluid pressure,
   said flow control means including a one-way valve permitting flow from the source of pressure to the ram means for moving said speed responsive unit to the inoperative position and including orifice means to allow escape of fluid under pressure from said ram means to said source of pressure in the other direction to place the speed responsive unit in the operative position.